July 12, 1966 J. M. BENSON ETAL 3,260,113
HEAT TRANSFER MEASURING APPARATUS
Filed July 29, 1963
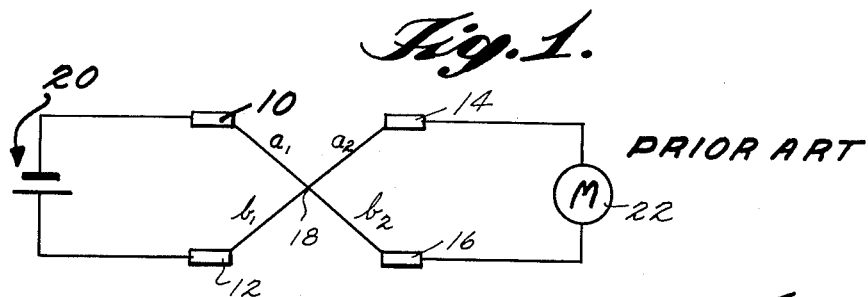
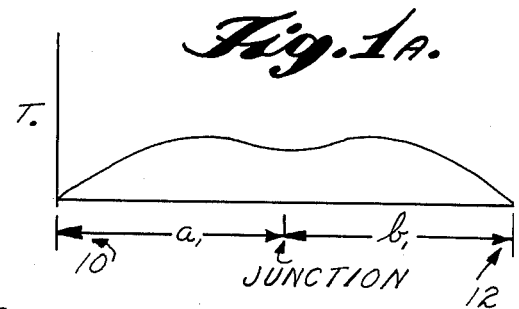
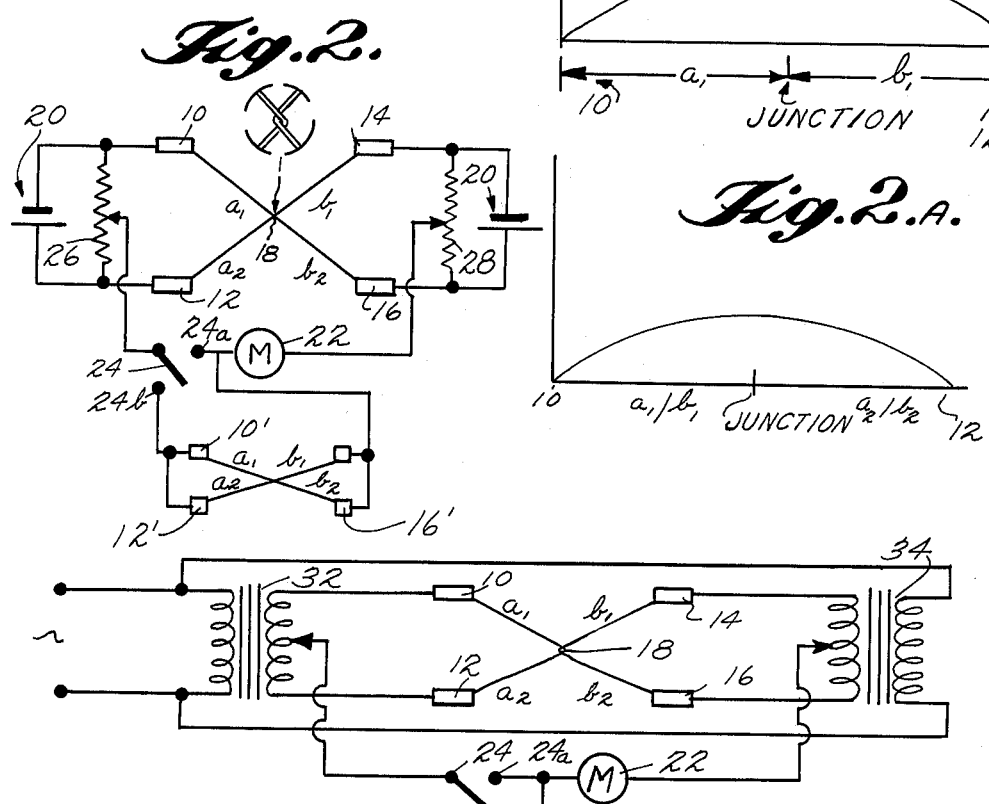
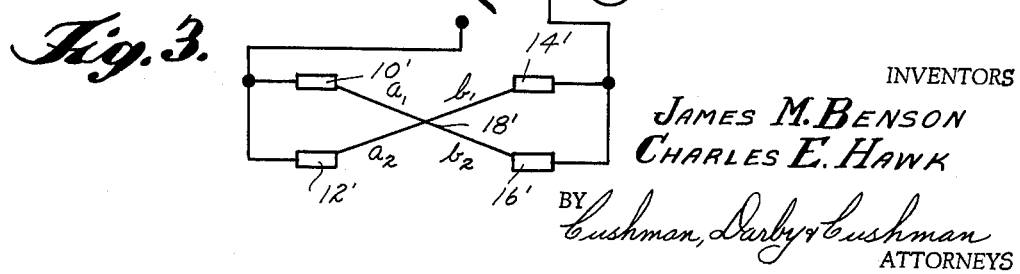
INVENTORS
JAMES M. BENSON
CHARLES E. HAWK
BY Cushman, Darby & Cushman
ATTORNEYS

United States Patent Office 3,260,113
Patented July 12, 1966

3,260,113
HEAT TRANSFER MEASURING APPARATUS
James M. Benson and Charles E. Hawk, Hampton, Va., assignors to Hastings-Raydist, Inc., Hampton, Va., a corporation of Virginia
Filed July 29, 1963, Ser. No. 298,345
6 Claims. (Cl. 73—359)

This invention pertains to heat transfer measuring apparatus and particularly to such apparatus of the heated thermocouple type wherein measurement is had of heat transferred to or from a heated thermocouple. A further feature of the invention is to provide compensation for transient thermocouple voltages generated during changes in ambient conditions to which the apparatus is subjected.

In accordance with one feature of the invention a thermocouple junction is formed from two pairs of dissimilar metal members, and heating current is passed through both pairs, thus achieving a uniform temperature gradient along the members in the vicinity of the junction.

In accordance with another feature of the invention, compensation for ambient transients is achieved by use of a thermocouple in voltage opposition to the other and exposed to the same ambient conditions, but unheated.

Further objects and the entire scope of the invention are set forth in the following detailed description of illustrative embodiments of the invention, and the appended claims. The illustrative embodiments may be best understood with reference to the herewith drawings, wherein:

FIGURE 1 shows a prior art type apparatus.
FIGURE 1A shows a plot of temperature against conductor length in the apparatus of FIGURE 1.
FIGURE 2 shows a first embodiment of the invention.
FIGURE 2A shows a plot of temperature against conductor length in the apparatus of FIGURE 2.
FIGURE 3 shows another embodiment of the invention.

FIGURE 1 is exemplary of prior art known to applicant wherein dissimilar metal members $a_1$, $b_1$, $a_2$ and $b_2$ extend from terminals 10, 12, 14 and 16, respectively, to a thermocouple junction 18. Usually, but not necessarily, $a_1$ and $a_2$ are of like metal, and $b_1$ and $b_2$ are alike, although of another metal. The terminals 10, 12, 14 and 16 are preferably quite massive and serve as heat sinks, while the junction 18 is relatively small in mass compared to the terminals. A source of heating current, shown here as battery 20, is connected across terminals 10 and 12, and a meter 22 is connected across terminals 14 and 16. Usually the conductors from 10 and 12 to 20 are of a still different metal, say copper, as are those from 14 and 16 to 22.

In operation, current flows from source 20 through $a_1$ junction 18, and returns through $b_1$. Thus, the junction 18 is heated to a degree dependent upon the amount of current. A certain thermoelectric voltage is therefore generated at junction 18 between $a_2$ and $b_2$ as the "hot" junction, opposed by voltages generated at terminals 14 and 16 if these are of a dissimilar metal and constitute "cold" junctions. The terminals and conductors to meter 22 can be the same as $a_1$ and $b_1$, in which case the "cold" junctions are formed at the meter terminals instead. In either case, the meter 22 will indicate the difference in temperature between junctions 18 and the "cold" junctions. In use, junction 18 is thermally coupled to the medium or member, the temperature of which is to be measured, and a reading at meter 22 is obtained which shows the increase or reduction in temperature of the junction due to the medium heating or cooling it.

The arrangement of FIGURE 1 suffers, however, from the serious disadvantage that the heating current is unable to create an even temperature along $a_1$, $a_2$, $b_1$ and $b_2$ near the junction 18. Instead, a distribution as shown in FIGURE 1A results. This is characterized by the dip in the vicinity of the junction 18, which is a serious matter in certain uses of the apparatus. The significant temperature is that of the heated thermocouple junction and this junction should be located at a point which is at the maximum temperature. Otherwise, difficulties may arise from overheating remote portions of the wires where undesired thermal reactions or melting of the wire may occur. Since the heated thermocouple junction in the prior art of FIGURE 1 is not at the point of maximum temperatures, the useful operating temperature of the junction is undesirably limited by the higher temperatures of parts of the wire external to the junction.

One use of consequence is in measuring the temperature of a running threadline, where the junction is touched to the threadline and any change in the reading of meter 22 is noted. If there is a change, the heating current is increased or decreased and the threadline touched again, and this sequence repeated until no change occurs. However, it is not always possible to touch the threadline exactly to the junction, and the contact may be slightly out along one of the members. In this case the meter 22 will not be showing exactly the temperature of the threadline. Moreover, albeit the thermocouple junction is as small as possible, there is an IR drop across it due to the heating current, and this becomes a factor in the calibration of meter 22.

The foregoing disadvantages are overcome by the present invention, an illustration of which is shown in FIGURE 2. Here a source of heating current is connected across terminals 10 and 12, and another source 20' across 14 and 16. Thermocouple member $a_1$ extends between 10 and junction 18, and $a_2$ between 12 and 18, with $b_1$ between 14 and 18, and $b_2$ between 16 and 18. Therefore, heating currents flow through all of $a_1$, $b_1$, $a_2$ and $b_2$. The sources 20 and 20' are poled oppositely, wherefore the heating current IR drops across junction 18 cancel out. Accordingly, the temperature gradient along the members now becomes substantially level in the vicinity of the junction, as shown in FIGURE 2A.

Assuming for the moment a switch 24 (FIGURE 2) closed to its contact 24a, the meter 22 is in a circuit between points of equi-potential in the respective heating current circuits. For convenience in adjustment, resistor 26 is provided in shunt with source 20, and resistor 28 with source 20'. Movable taps thereon connect with meter 22. Assuming these taps adjusted so that no voltage due to heating currents appears across meter 20, the meter will then indicate solely the net voltage generated in the junction 18.

The junction 18 may be constructed as shown in the enlarged view of FIGURE 2, by having $a_1$ and $a_2$ as one strand of one metal and $b_1$ and $b_2$ as one strand of another metal. These strands may then be hooked over one another as shown to form the junction. Preferably they are also spot welded at this point, as by momentary passage of electric current therethrough.

FIGURE 3 shows a circuit like FIGURE 2 except alternating current is employed for heating purposes. Transformers 32 and 34 have tapped secondaries for this purpose.

In regard to both FIGURES 2 and 3 it should be understood that the taps from the meter into the circuits need not be at any particular potential point in respect to each source of heating current, but only that no net voltage across the meter exist because of the heating currents. The taps could be directly to terminals 12 and 16, for example, if some way be provided to adjust the sources to preclude the aforesaid voltage.

As aforesaid, the terminals 10, 12, 14 and 16 are massive and serve as "heat sinks" so as to keep them at ambient, notwithstanding the heat delivered thereinto from the heated members that proceed to the junction 18. The junction 18 is of less mass. Therefore, during changes in ambient there will be a greater thermal inertia of the terminals than the junction in reaching the new ambient temperature and spurious voltages will be generated during this time. These transients may be compensated for by providing another thermocouple arrangement in series with meter 22 but in voltage opposition thereto. Such is shown in FIGURE 2 where massive terminals 10′, 12′, 14′ and 16′ have members $a_1$, $b_1$, $a_2$ and $b_2$ extending to junction 18′. However, this junction is unheated, wherefore it generates a net voltage only in respect to the ambient conditions to which all of the terminals and both junctions of the main and compensating units are exposed.

A similar compensation thermocouple is shown with the embodiment of FIGURE 3. In both cases the compensating couple may be brought into use by moving switch 24 to contact 24b.

It will thus be observed that a greatly improved temperature measuring apparatus is provided by the present invention, of which illustrative embodiments are shown above. The true scope of the invention is set forth by the appended claims.

What is claimed is:

1. Heat transfer measuring apparatus comprising a first pair of dissimilar metal members joined to form a thermocouple junction, a second pair of dissimilar metal members joined to said junction, means for passing heating current through all four of said members, and means connected to the ends of the metal members opposite from the junction for measuring the thermocouple current generated in said junction.

2. Heat transfer measuring apparatus comprising two pairs of dissimilar metal members joined at a common thermocouple junction and each member having a terminal end opposite from its junction end, first circuit means including a source of heating current joining together the terminal ends of two of said members for heating said members and said junction, second circuit means including a source of heating current joining together the terminal ends of the other two of said members for heating said members and the junction, and thermocouple current measuring means connected between points in the first and second circuit means, which points are at equipotential points in respect to said sources of heating current.

3. Apparatus as in claim 2 wherein the two pairs of members joined at said junction are constructed by two strands of dissimilar metals being crossed over intermediate the ends thereof.

4. Apparatus as in claim 3 wherein the circuit means is connected across terminal ends of like metals.

5. Apparatus as in claim 4 and further including in series with said current measuring means a second array of dissimilar metal members substantially identical to the first and in polarity opposition thereto but unheated to compensate for transient thermocouple potentials generated by changes in an ambient condition to which both thermocouple junctions are exposed.

6. Apparatus as in claim 1 and further including in series with said current measuring means a second array of dissimilar metal members substantially identical to the first and in polarity opposition thereto but unheated to compensate for transient thermocouple potentials generated by changes in an ambient condition to which both thermocouple junctions are exposed.

No references cited.

LOUIS R. PRINCE, *Primary Examiner.*